US009147208B1

(12) United States Patent
Argue et al.

(10) Patent No.: US 9,147,208 B1
(45) Date of Patent: Sep. 29, 2015

(54) CUSTOMER-CONFORMAL SHOPPING LIST ROUTING

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 14/473,762

(22) Filed: Aug. 29, 2014

(51) Int. Cl.
*G06K 15/00* (2006.01)
*G06Q 30/06* (2012.01)

(52) U.S. Cl.
CPC .................................... *G06Q 30/06* (2013.01)

(58) Field of Classification Search
CPC ... G06Q 20/343; G06Q 30/06; G06Q 10/087; G07F 7/02; G07F 1/00
USPC .................................................. 235/383, 385
See application file for complete search history.

(56) References Cited

U.S. PATENT DOCUMENTS

| | | | |
|---|---|---|---|
| 5,294,781 A | 3/1994 | Takahashi | |
| 6,386,450 B1 | 5/2002 | Ogasawara | |
| 6,659,344 B2 | 12/2003 | Otto | |
| 6,820,062 B1 | 11/2004 | Gupta | |
| 6,854,656 B2 | 2/2005 | Matsumori | |
| 6,895,330 B2 | 5/2005 | Cato | |
| 7,147,154 B2 * | 12/2006 | Myers et al. | 235/383 |
| 7,245,214 B2 | 7/2007 | Smith | |
| 7,739,157 B2 | 6/2010 | Bonner | |
| 8,195,519 B2 | 6/2012 | Bonner | |
| 8,364,171 B2 | 1/2013 | Busch | |
| 2006/0149628 A1 | 7/2006 | Chefalas | |
| 2008/0042836 A1 | 2/2008 | Christopher | |
| 2013/0332273 A1 | 12/2013 | Gu | |
| 2014/0003727 A1 * | 1/2014 | Lortz et al. | 382/218 |
| 2014/0172476 A1 * | 6/2014 | Goulart | 705/7.11 |
| 2014/0279294 A1 * | 9/2014 | Field-Darragh et al. | 705/28 |

FOREIGN PATENT DOCUMENTS

| EP | 1583050 A1 | 10/2005 |
|---|---|---|
| EP | 2728533 A1 | 5/2014 |

\* cited by examiner

*Primary Examiner* — Seung Lee
(74) *Attorney, Agent, or Firm* — Howard & Howard Attorneys PLLC

(57) ABSTRACT

A record of a transaction of a customer includes the order the items were scanned. The reverse of this order is inferred to conform generally to the order items were placed in the cart. A route of the user is inferred from the locations of items and the reverse of the scanning order. Subsequent shopping lists of the customer may be ordered to conform to the inferred route as well as one or more route optimization criteria such as a preference for shorter routes or avoiding doubling back. Recommendations for items along the typical route may also be generated and transmitted to the customer. Non-conformal segments may be added to a route for a shopping list in order to route the customer past other portions of a store. Recommendations for items located along the non-conformal segments may also be added.

20 Claims, 6 Drawing Sheets

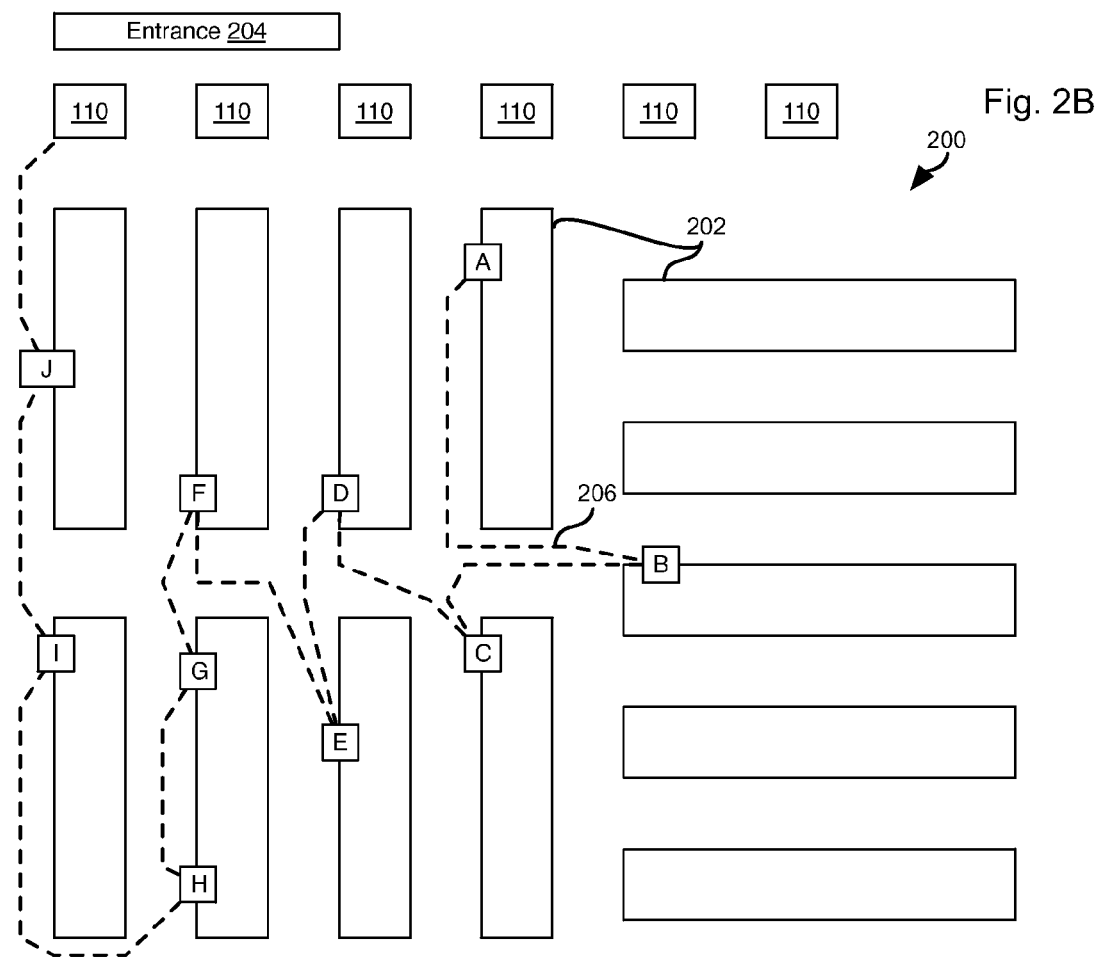

CUSTOMER-CONFORMAL SHOPPING LIST ROUTING

BACKGROUND

1. Field of the Invention

This invention relates to systems and methods for providing in-store directions to shoppers.

2. Background of the Invention

The global positioning system (GPS) has been widely used to provide turn-by-turn directions to drivers. Some attempts have been made to use GPS to provide similar turn-by-turn directions in a shopping environment. However, such attempts have been ineffective due to one or both of limited reception in a store and the limited accuracy of GPS receivers on the scale needed to locate items in a store. Other approaches such as RFID or BLUETOOTH beacons have also been used, but likewise lack the needed accuracy.

The systems and methods described herein provide an improved approach for providing in-store directions.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2B is a schematic block diagram of the retail environment having a shopping list route conforming to an inferred route in accordance with an embodiment of the present invention;

DETAILED DESCRIPTION

Figure 1:
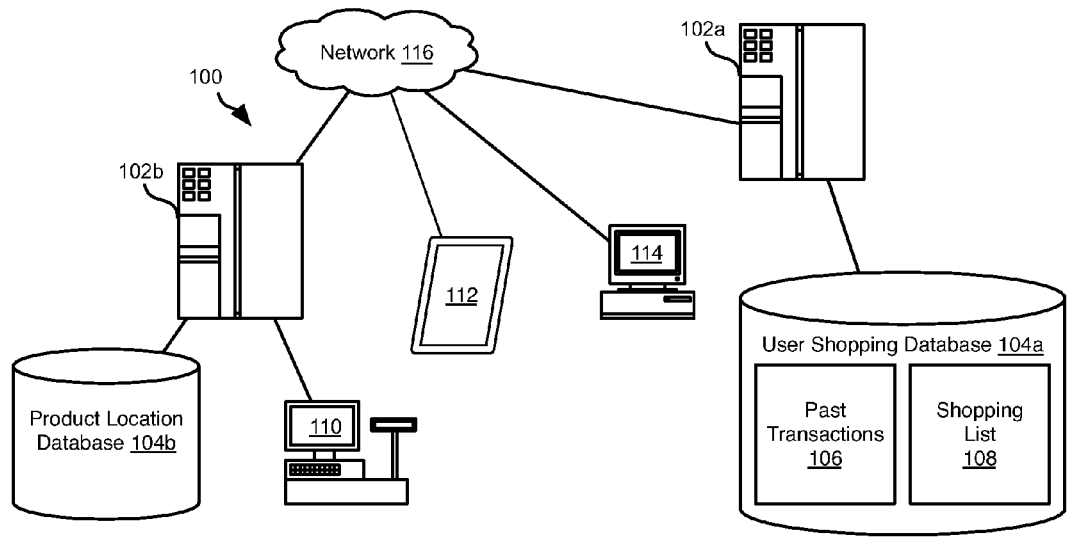
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. A record of a transaction of a customer includes the order the items were scanned. The reverse of this order is inferred to conform generally to the order items were placed in the cart. A typical route of the user is inferred from the locations of items and the reverse of the scanning order. Subsequent shopping lists of the customer may be ordered to conform to the typical route as well as one or more route optimization such as a preference for shorter routes or avoiding doubling back. Recommendations for items along the typical route may also be generated and transmitted to the customer.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a network environment 100 in which the systems and methods disclosed herein may be implemented. For example, a server system 102a may host a user shopping database 104a that stores data in user accounts for a plurality of users. A user account may store such information as records of past transactions 106 by a user and one or more shopping lists 108 of the user. A record of a past transaction 106 may include a list of items purchased in the transaction, the prices paid, the store where the transaction occurred, an identifier of a point of sale (POS) 110 at which payment was made, a time and date, and/or other information. In some embodiments, the transaction record may also list an order in which items were scanned or otherwise input to the POS 110. A shopping list 108 may be a list of items selected by the user and transmitted to the server system 102a, which then stores the list in the account of the user. For example, a user may input a shopping list by means of a mobile computing device 112 such as a mobile phone, tablet computer, wearable computer, or some other computing device. A user may also input a shopping list by means of a computer 114 such as a laptop or desktop computer. A shopping list 108 may be input by navigating an interface to a product catalog on a device 112, 114, the interface being generated by the server system 102a with reference to a product database.

A retail establishment may be associated with a server system 102b that receives records of transactions from one or more POSs 110 located at the retail establishment. The server system 102b may host or access a product location database 104b that maps products to locations in the floor plan of the store. Alternatively, the product location database 104b may be hosted or accessed by the server system 102a. A product location database 104b may map a product identifier to a location in the retail establishment. For example, a product identifier may be mapped to a shelf identifier and a shelf identifier may be mapped to a physical location in the retail establishment, e.g. in the form of globally defined coordinates or with respect to some local datum point in the retail establishment.

Although the methods disclosed herein are described as being performed on behalf of a user on one or both of the server systems 102a, 102b, in some embodiments, data for performing the disclosed methods may be provided to a computing device 112, 114, which then performs some or all of the steps of the disclosed methods.

The server systems 102a, 102b and computing devices 112, 114 may communicate with one another by means of a network 116, such as a local area network (LAN), wide area network (WAN), the Internet, or some other network. The data connection between the server systems 102a, 102b and computing devices 112, 114 may include any wired or wireless protocol.

Figure 2A:
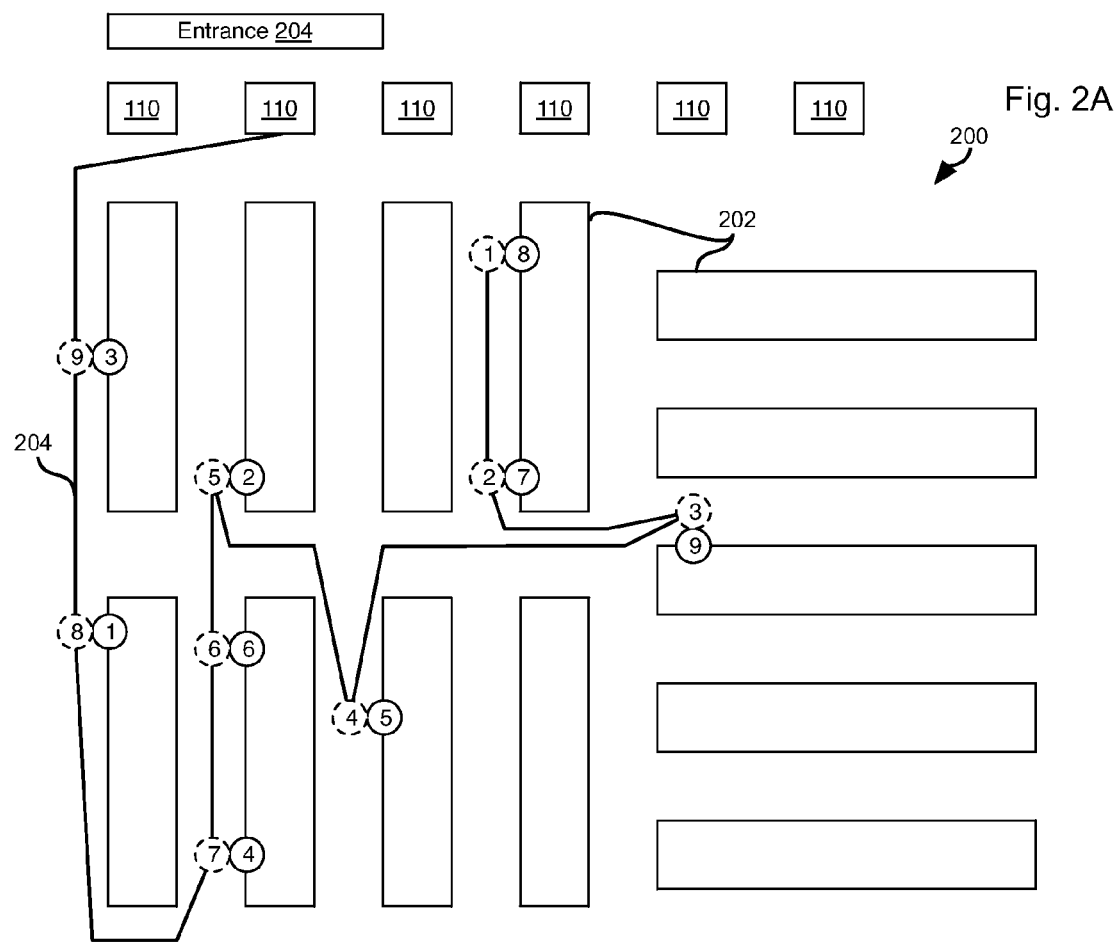
FIG. 2A is a schematic diagram of a retail environment including a route inferred from a scan order in accordance with an embodiment of the present invention.

FIG. 2A illustrates a floor plan 200 of a retail establishment. The floor plan 200 may include shelving 202 and other displays or structures for storing goods. The locations of the shelving 202 and other displays or structures may be included in an electronic representation floor plan. The floor plan 200 may include one or more POS 110 locations and locations of one or more entrances 204 to the retail establishment. Again, the position of the entrance 204 and the POS stations 108 may be in an electronic representation of the floor plan 200.

A transaction may include a plurality of items that are scanned in a particular order. For example, the solid circles numbers 1 to 9 may indicate the order in which items were input to the POS 110 upon concluding a transaction. In practice, a customer will add items into a cart or basket such that items on the top are more likely to be added last and more likely to be scanned before items on the bottom. Accordingly, the reverse of the scanning order may correspond generally to the order in which items were added to the cart or basket.

Accordingly, a route 204 may be inferred that conforms generally to the inverse scanning order. The route 204 may be a route of a plurality of possible routes visiting the locations of the purchased items that both conforms generally to the reverse scanning order and some other optimization criteria. For example, the route 204 may be route that conforms generally to the reverse scanning order and also is shorter than other possible routes. The optimization criteria may also prefer as the route 204 routes that do not require back tracking or doubling back. Other route optimization criteria known in the art of routing may also be used.

The inferred route 204 may visit the locations of the items purchased in a transaction in an inferred ordering shown by the dashed circles in FIG. 2A. As is apparent, the inferred route 204 does not conform exactly to the reverse scanning order, nor should it since the reverse scanning order is not necessarily the exact route traversed by the customer when retrieving the items.

FIG. 2A illustrates using the reverse scanning order for one transaction to determine the inferred route 204. Alternatively, the reverse scanning order of multiple transactions may be evaluated in a similar manner. In particular, the inferred route may be a possible route that conforms generally to the reverse scanning order of the multiple transactions as well as the one or more optimization criteria.

FIG. 2B illustrates the use of the inferred route to order a subsequently received shopping list that may include some items from the transaction evaluated as shown in FIG. 2A and may include items not purchased in the transaction. As is readily apparent items A through J are visited by route 206 that conforms generally to the route 204 while still visiting items not included in the transaction evaluated.

Figure 3:
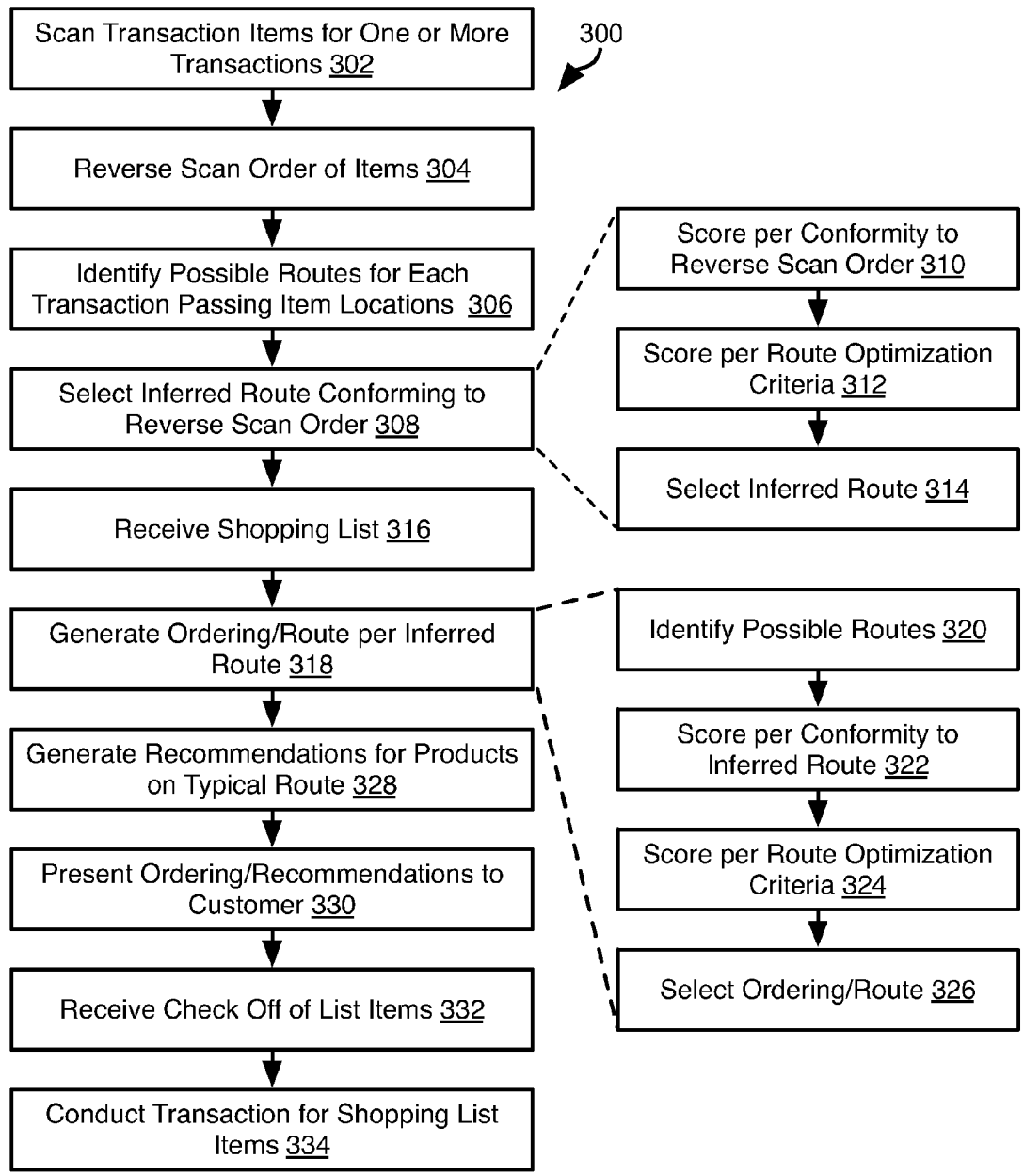
FIG. 3 is a process flow diagram of a method for generating a shopping list conforming to a customer's preferred route in accordance with an embodiment of the present invention.

FIG. 3 illustrates a method 300 by which an inferred route may be determined and by which a route and ordering for a shopping list may be determined using the inferred route. The method 300 may be executed by a server system 102*a*, 102*b* or by one or more user devices 112, 114. For example, processing may occur on a server system 102*a*, 102*b* with interaction with an interface presented on one or more user devices 112, 114.

For example, the method 300 may include scanning 302 items for one or more transactions at a POS 110. Each transaction may include multiple items and may be scanned in a scanning order at the POS 110. This scanning order may be preserved in a record of each transaction as well as identifiers of the items scanned. The transaction records may be transmitted by one or more POS 110 to the server system 102*a* or 102*b*.

The scanning order of items of the transactions may then be reversed 304 and possible routes may be identified 306 for each transaction that pass by the locations of the items of each transaction. For example, using the product location database 104*b*, the locations of items of a transaction may be identified for the retail establishment at which the transaction occurred. A location of the POS 110 at which the transaction occurred may also be identified from an electronic representation of the floor plan 200 of the retail establishment. The location of one or more entrances 204 for the floor plan 200 of the retail establishment may also be identified from the electronic representation of the floor plan 200. Possible routes for a transaction may be identified that begin at an entrance, pass by locations of each item of the transaction, and terminate at the POS 110 at which the transaction occurred. In some embodiments, the set of possible routes for a transaction may be pruned to eliminate routes that are clearly sub-optimal according to some optimization criteria, i.e. that are much longer than other routes, require excessive back tracking, or include some other sub-optimal characteristic. In some embodiments, identifying 306 possible routes may include only identifying routes that satisfy one or more of these route optimization criteria.

The method 300 may further include selecting 308 for each transaction an inferred route that conforms to the reverse scanning order. For example, a route of the possible routes identified at step 306 may be selected as being more similar to the reverse scanning order and better satisfying one or more route optimization criteria with respect to others of the possible routes identified at step 306.

For example, selecting the inferred route may be selected 308 using some or all of steps 310 to 314. Some or all of the possible routes identified at step 306 may be scored 310 according to conformity to the reverse scan order. For example, a sum of scores S, each corresponding to an item of the transaction, may be calculated for some or all of the identified possible routes. For example a score Si for an item i may increase with decreasing of a difference between the position of the item i in the reverse scanning order and the position of the item i in a possible route. For example, where item i is the Nth item in the reverse scanning order and the Mth item visited by a possible route, then the score Si may decrease with increasing of the value Abs(N−M) according to some function. For a route, the values of Si for each item may be summed or weighted and sum to obtain the score for that route computed at step 310. For example, small items may be more likely to fall down in the cart even if added to the cart toward the end of a shopping trip. Accordingly, a score Si of an item i may be weighted with a weight Wi that increases with increasing size of the item, i.e. larger items have a higher weight than smaller items. The weight may also increase with decreasing density (i.e. some ratio of weight to size) inasmuch as small heavy items are more likely to fall down than larger and lighter items.

Some or all of the possible routes identified at step 306 may also be scored 312 according to one or more route optimization criteria. For example, a possible route may be assigned a score at step 312 such that longer routes have a lower score than shorter routes according to some function. Multiple scores may be assigned at step 312 according to multiple route optimization criteria. For example, a score may be assigned that decreases with the extent of overlapping portions of the route (e.g. doubling back).

A route of the possible routes may then be selected 314 as the inferred route according to the scores computed at steps 310 and 312. For example, the scores of steps 310 and 312 for each route may be summed or weighted and summed to obtain a final score for each route. The route with the highest final score may then be selected at the inferred route.

As noted above, multiple transactions may be processed and an inferred route selected for each transaction. Accordingly, a collection of inferred routes may be created and stored for multiple transactions of a user. As noted above, each inferred route is a route that passes by the location of each item of the transaction analyzed to generate the route. Accordingly, the inferred route also defines an ordering of retrieval of the items of the transaction according to when the locations of the items are visited by the inferred route.

The method 300 may further include receiving a shopping list from a user, such as from a user computing device 112, 114 as described above. An ordering and route passing by the locations of the items of the shopping list may be generated 318 according to one or more inferred routes determined at step 308. The shopping list may include some of the same items from the transactions processed according to the preceding steps and may include different items as well.

Generating 318 and ordering and route according to one or more inferred routes may include executing some or all of steps 320-326. For example, one or more possible routes passing by the locations of the items of the shopping list may be identified 320. In the same manner as for step 306, some possible routes may be pruned or not identified as possible routes due to failure to satisfy one or more route optimization criteria.

The possible routes identified may be scored 322 according to conformity to one or more inferred routes. For example, a sum of scores S, each corresponding to an item of the shopping list, may be calculated for some or all of the identified possible routes with respect to some or all o the inferred routes. For example, a score Si for a possible route i with respect to an inferred route may increase with the extent of portion of the route i that are coextensive with or within some threshold distance from the inferred route. Routes may define a direction for segments of the route starting at one item and traveling to the next item. Accordingly, the score of a possible route with respect to an inferred route may take into account whether coextensive or within-threshold proximate portions are oriented in the same direction. For example, coextensive or proximate portions of the inferred route and possible route may cause the score to increase with similarity in direction. In summary, the score for a possible route with respect to an inferred route may increase with the extent of coextensive or within-threshold portions, proximity of portions of the possible route to the inferred route, and similarity in orientation of coextensive or within-threshold portions of the possible and inferred routes.

In instances where there are multiple inferred routes, an aggregate score of a possible route according to step 322 may be a sum of scores calculated with respect to each inferred route as described above. Alternatively, the score for an inferred route as computed at step 322 may be the maximum score of the scores calculated with respect to the multiple inferred routes as described above.

A route and the corresponding order in which items of the shopping list are visited according to the route are selected at step 326 according to the scores determined at steps 320 and 322. For example, a final score for a possible route may be a sum or weighted sum of these scores and the possible route with the highest final score may be selected at step 326.

At step 328 one or more product recommendations are generated 328 for the customer. Recommendations may be selected for products that are located long the route selected at step 318. For example, the customer's past transactions may be analyzed and interests of the customer inferred. One or more products that correspond to these interests may be selected. Among these identified products, those that are located along the generated 318 route may be selected for product recommendations. A promotion for the one or more selected products may be retrieved or generated. The promotion may be a discount, buy-one-get-one free, or some other promotion for the one or more selected products.

The method 300 may include presenting 330 the ordering of the shopping list according to the generated 318 route to the customer as well as any recommendations. For example, the ordered shopping list may be transmitted to a user device 112, 114. Transmitting the ordered shopping list may include transmitting turn-by-turn directions guiding the customer around the floor plan 200 from one item of the list to the next along the generated 318 route.

The method 330 may further include receiving 332, such as on the mobile device 112, checking off of items in the shopping list. In some embodiments, the checking off of items may be used to infer the location of the customer. Accordingly, in response to receiving check off of an item, directions to the next item of the ordered shopping list may be output on the mobile device 112. In this manner, accurate locational data is not required in order to provide guidance to the customer.

A transaction for purchase of some or all of the items of the shopping list, and possibly one or more other items, may be conducted 334 at a POS 110. The directions presented to the user may include directions to the POSs 110 after receiving check off of a last item in the shopping list.

Figure 4:
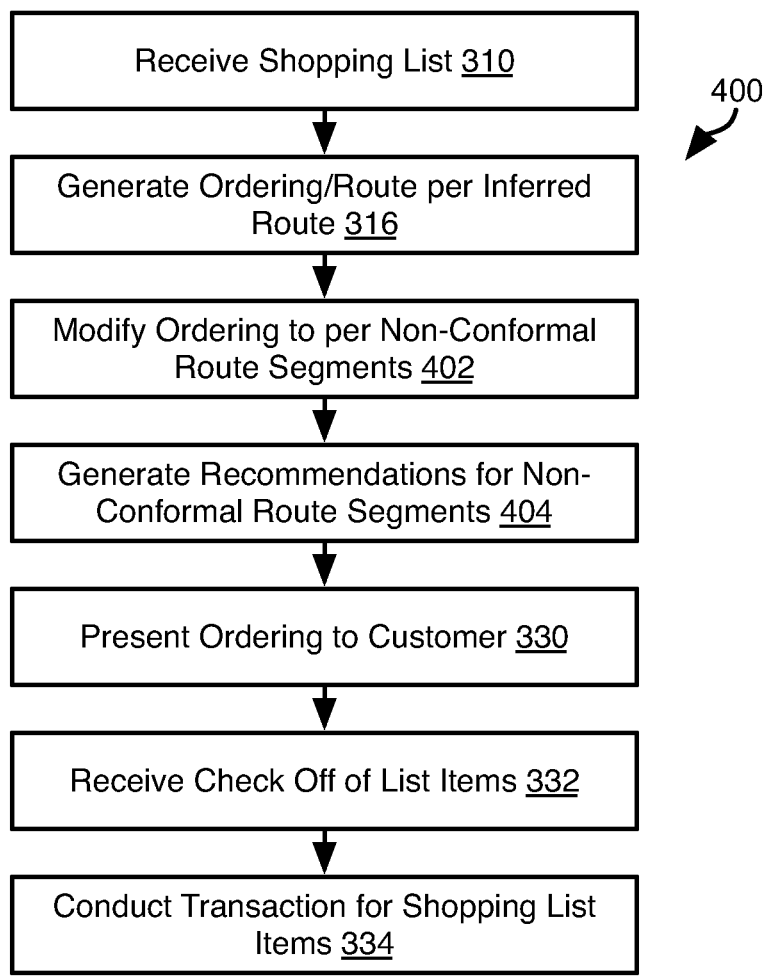
FIG. 4 is a process flow diagram of a method for ordering a shopping list to traverse non-conformal portions of a retail environment in accordance with an embodiment of the present invention.

FIG. 4 illustrates an alternative method 400 by which an inferred route may be determined and by which a route and ordering for a shopping list may be determined using the inferred route. The method 400 may be executed by a server system 102a, 102b or by one or more user devices 112, 114. For example, processing may occur on a server system 102a, 102b with interaction with an interface presented on one or more user devices 112, 114.

The method 400 may include receiving 310 a shopping list and generating 316 an ordering according to an inferred route in the same manner as for the method 300. The method 400 may further include modifying 402 ordering of the shopping list in order to include one or more non-conformal or atypical route segments, i.e. segments that are not selected according to conformance to one or more inferred paths. For example, interests of the customer may be inferred from past purchases and products corresponding to these interests may be identi-
fied. In particular, those products likely to be of interest may be identified that are not located along the route generated at step 316. Accordingly, non-conformal segments maybe generated and added to the route, or substituted for portions of the route, determined at step 316 that direct the shopper past the locations of the identified products. Recommendations for the products on the non-conformal segments may also be generated 404. As for the recommendations above, the recommendations may include any of the above-mentioned types of promotions.

The ordering of the shopping list as modified at step 402 may be presented 330 to the customer along with the recommendations, as described with respect to step 330 of the method 300. Likewise, check off of items may be received 332 and a transaction conducted for the checked off items in the same manner as for the method 300.

Figure 5:
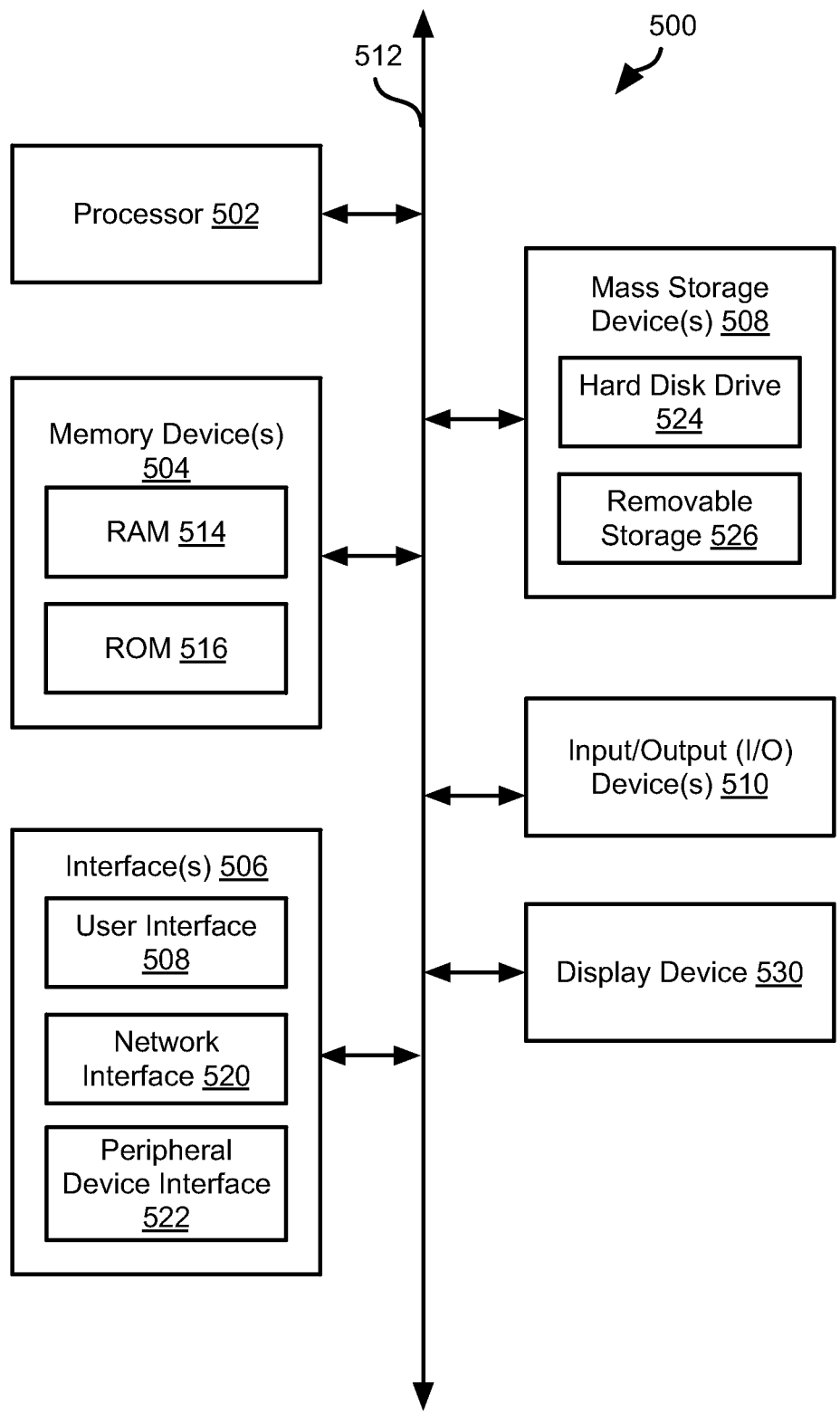
FIG. 5 is a schematic block diagram of a computer system suitable for implementing methods in accordance with embodiments of the present invention.

FIG. 5 is a block diagram illustrating an example computing device 500. Computing device 500 may be used to perform various procedures, such as those discussed herein. Computing device 500 can function as a server, a client, or any other computing entity, including any of the server systems 102a, 102b, POS 110, and user computing devices 112, 114. Computing device can perform various monitoring functions as discussed herein, and can execute one or more application programs, such as the application programs described herein. Computing device 500 can be any of a wide variety of computing devices, such as a desktop computer, a notebook computer, a server computer, a handheld computer, tablet computer and the like.

Computing device 500 includes one or more processor(s) 502, one or more memory device(s) 504, one or more interface(s) 506, one or more mass storage device(s) 508, one or more Input/Output (I/O) device(s) 510, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more user interface elements 518. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, and I/O device(s) 510 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   receiving, by a computer system, from a point of sale (POS) device a transaction record including a first list of first items purchased in a transaction listed in an order the items were scanned at the POS device;
   identifying, by the computer system, first locations of each first item of the first list of first items in a floor plan of a store including the POS device;
   selecting a first route through the floor plan of the store according to an optimization algorithm that selects the first route from among a plurality of routes passing the first locations of the first items of the first list according to at least one optimization criteria and according to conformance to a reverse ordering of the order the first items were scanned at the POS device;
   receiving, by the computer system, from a user device, a second list of second items, the second list being different from the first list;
   identifying, by the computer system, second locations of each second item of the second list of second items in the floor plan;
   selecting, by the computer system, a second route through the floor plan of the store according to the optimization algorithm that selects the second route from among a plurality of routes passing the second locations of the second items according to the at least one optimization criteria and according to similarity to the first route; and
   transmitting, by the computer system, the second route to one of the user device and an other device.

2. The method of claim 1, wherein the at least one optimization criteria includes a preference for shorter routes.

3. The method of claim 1, wherein the at least one optimization criteria includes a preference for routes avoiding doubling back.

4. The method of claim 1, further comprising:
   identifying, by the computer system, a recommended item having a location in the floor plan proximate the second route; and
   transmitting, by the computer system, a recommendation referencing the recommended item to one of the user device and the other device.

5. The method of claim 4, wherein identifying the recommended item having the location in the floor plan proximate the second route comprises:
   evaluating past transactions of the user;
   identifying interests of the user;
   identifying products relating to the interests of the user; and
   selecting the recommended item from among the identified products according to proximity to the second route.

6. The method of claim 5, further comprising transmitting to one of the user device and the other device a discount for the recommended item.

7. The method of claim 1, wherein the user device is a mobile device.

8. The method of claim 1, wherein transmitting, by the computer system, the second route to one of the user device and another device further comprises transmitting an ordering of the second items according to an order visited when following the second route.

9. The method of claim 1, wherein transmitting, by the computer system, the second route to one of the user device and another device comprises transmitting turn-by-turn directions along the second route.

10. The method of claim 1, further comprising:
    including, by the computer system, in the second route one or more non-conforming segments selected for being offset from the first route; and
    transmitting, by the computer system, to one of the user device and the other device a promotion for a recommended item positioned along the one or more non-conforming segments.

11. An apparatus comprising one or more processors and one or more memory devices operably coupled to the one or more processors, the one or more memory devices storing executable and operational data effective to cause the one or more processors to:
    receive from a point of sale (POS) device a transaction record including a first list of first items purchased in a transaction listed in an order the items were scanned at the POS device;

identify first locations of each first item of the first list of first items in a floor plan of a store including the POS device;
select a first route through the floor plan of the store according to an optimization algorithm that selects the first route from among a plurality of routes passing the first locations of the first items of the first list according to at least one optimization criteria and according to conformance to a reverse ordering of the order the first items were scanned at the POS device;
receive from a user device, a second list of second items, the second list being different from the first list;
identify second locations of each second item of the second list of second items in the floor plan;
select a second route through the floor plan of the store according to the optimization algorithm that selects the second route from among a plurality of routes passing the second locations of the second items according to the at least one optimization criteria and according to similarity to the first route; and
transmit the second route to one of the user device and an other device.

12. The apparatus of claim 11, wherein the at least one optimization criteria includes a preference for shorter routes.

13. The apparatus of claim 11, wherein the at least one optimization criteria includes a preference for routes avoiding doubling back.

14. The system of claim 11, wherein the executable and operational data are further effective to cause the one or more processors to:
identify a recommended item having a location in the floor plan proximate the second route; and
transmit a recommendation referencing the recommended item to one of the user device and the other device.

15. The system of claim 14, wherein the executable and operational data are further effective to cause the one or more processors to identify the recommended item having the location in the floor plan proximate the second route by:
evaluating past transactions of the user;
identifying interests of the user;
identifying products relating to the interests of the user; and
selecting the recommended item from among the identified products according to proximity to the second route.

16. The system of claim 15, further comprising transmitting to one of the user device and the other device a discount for the recommended item.

17. The system of claim 11, wherein the user device is a mobile device.

18. The system of claim 11, wherein the executable and operational data are further effective to cause the one or more processors to transmit the second route to one of the user device and another device by transmitting an ordering of the second items according to an order visited when following the second route.

19. The system of claim 11, wherein the executable and operational data are further effective to cause the one or more processors to transmit the second route to one of the user device and another device by transmitting turn-by-turn directions along the second route.

20. The system of claim 11, wherein the executable and operational data are further effective to cause the one or more processors to:
include in the second route one or more non-conforming segments selected for being offset from the first route; and
transmit to one of the user device and the other device a promotion for a recommended item positioned along the one or more non-conforming segments.

\* \* \* \* \*